(12) United States Patent
Mau et al.

(10) Patent No.: US 9,817,449 B2
(45) Date of Patent: Nov. 14, 2017

(54) HOUSING HAVING A CARRIER DEVICE

(71) Applicants: LITE-ON ELECTRONICS (GUANGZHOU) LIMITED, Guangzhou (CN); LITE-ON TECHNOLOGY CORP., Taipei (TW)

(72) Inventors: Shu-Hua Mau, Taipei (TW); Yue-Wen Jiang, Taipei (TW)

(73) Assignees: Lite-On Electronics (Guangzhou) Limited, Guangzhou (CN); Lite-On Technology Corp., Taipei (TW)

(*) Notice: Subject to any disclaimer, the term of this patent is extended or adjusted under 35 U.S.C. 154(b) by 11 days.

(21) Appl. No.: 14/837,391

(22) Filed: Aug. 27, 2015

(65) Prior Publication Data

US 2016/0295736 A1    Oct. 6, 2016

(30) Foreign Application Priority Data

Mar. 30, 2015 (CN) .................... 2015 2 0185191 U

(51) Int. Cl.
*H05K 7/00* (2006.01)
*G06F 1/18* (2006.01)
(52) U.S. Cl.
CPC ..................................... *G06F 1/18* (2013.01)

(58) Field of Classification Search
None
See application file for complete search history.

(56) References Cited

U.S. PATENT DOCUMENTS

| 6,507,487 B1* | 1/2003 | Barina | G06F 1/187 312/236 |
| 2009/0016007 A1* | 1/2009 | Chen | G11B 33/123 361/679.57 |
| 2012/0281351 A1* | 11/2012 | Chen | G06F 1/187 361/679.37 |

* cited by examiner

*Primary Examiner* — Courtney Smith
*Assistant Examiner* — Rashen E Morrison
(74) *Attorney, Agent, or Firm* — Rosenberg, Klein & Lee

(57) ABSTRACT

A housing includes a housing body formed with an engaging groove and a carrier device disposed in the housing body. The carrier device includes a carrier frame and a latching assembly. The carrier frame is configured to carry an electronic component and includes a pivoting sidewall rotatably pivoted to the housing body. The carrier frame is rotatable between a first position, where the carrier frame is disposed in the housing body, and a second position, where the carrier frame is pivoted out of the housing body. The latching assembly is disposed on the pivoting sidewall and is releasably engaged to the engaging groove so as to position the carrier frame at the second position.

17 Claims, 15 Drawing Sheets

HOUSING HAVING A CARRIER DEVICE

CROSS-REFERENCE TO RELATED APPLICATION

This application claims priority to Chinese Application No. 201520185191.3, filed on Mar. 30, 2015.

FIELD

The disclosure relates to a housing, and more particularly to a housing having a carrier device for carrying an electronic component.

BACKGROUND

At present, a housing of a computer or a server generally includes a housing body and a carrier frame rotatably pivoted to the housing body for carrying a hard disk drive or an optical disk drive. The carrier frame can be rotated outwardly relative to the housing body, so that a user can inspect, repair or replace the electronic components inside the housing body, or the hard/optical disk drive carried by the carrier frame.

Since there is no positioning structure between the carrier frame and the housing body, when the carrier frame is in an outward position relative to the housing body, the user may accidentally bump the carrier frame so that the carrier frame suddenly rotates back into the housing body, causing injury to the user's hand. In addition, a sudden impact of the carrier frame against the housing body may damage the hard/optical disk drive.

SUMMARY

Therefore, an object of the disclosure is to provide a housing having a carrier device. When a carrier frame of the carrier device is rotated to a second position relative to a housing body of the housing, the carrier frame is secured to the housing body by a latching assembly, so that the carrier frame can be stably positioned at the second position, thereby increasing the safety of operation and use thereof.

Another object of the disclosure is to provide a housing having a carrier device. A structure of a latching assembly of the carrier device is relatively simple, thereby reducing the fabrication cost thereof.

Still another object of the disclosure is to provide a housing having carrier device. A latching assembly of the carrier device is easy and simple to operate so as to conveniently and quickly secure or release a carrier frame of the carrier device to or from a housing body of the housing.

According to the disclosure, a housing for mounting of an electronic component includes a housing body formed with an engaging groove and a carrier device disposed in the housing body.

The carrier device includes a carrier frame and a latching assembly. The carrier frame is configured to carry the electronic component and includes a pivoting sidewall rotatably pivoted to the housing body. The carrier frame is rotatable between a first position, where the carrier frame is disposed in the housing body, and a second position, where the carrier frame is pivoted out of the housing body. The latching assembly is disposed on the pivoting sidewall and is releasably engaged to the engaging groove so as to position the carrier frame at the second position.

The advantages and effectiveness of the disclosure reside in that, through the configuration of the latching assembly, when the carrier frame is rotated to the second position relative to the housing body, the carrier frame can be secured to the housing body by the latching assembly, so that the carrier frame can be stably positioned at the second position, thereby increasing the safety of operation and use thereof. In addition, since the manufacturing method and the structure of the latching assembly are relatively simple, the manufacturing duration and the fabrication cost of the latching assembly can be significantly reduced. As a result, the latching assembly can be conveniently and quickly assembled and positioned to the pivoting sidewall. Moreover, the operation of the latching assembly is easy and simple, so that it can be conveniently and quickly secured to or released from the housing body.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
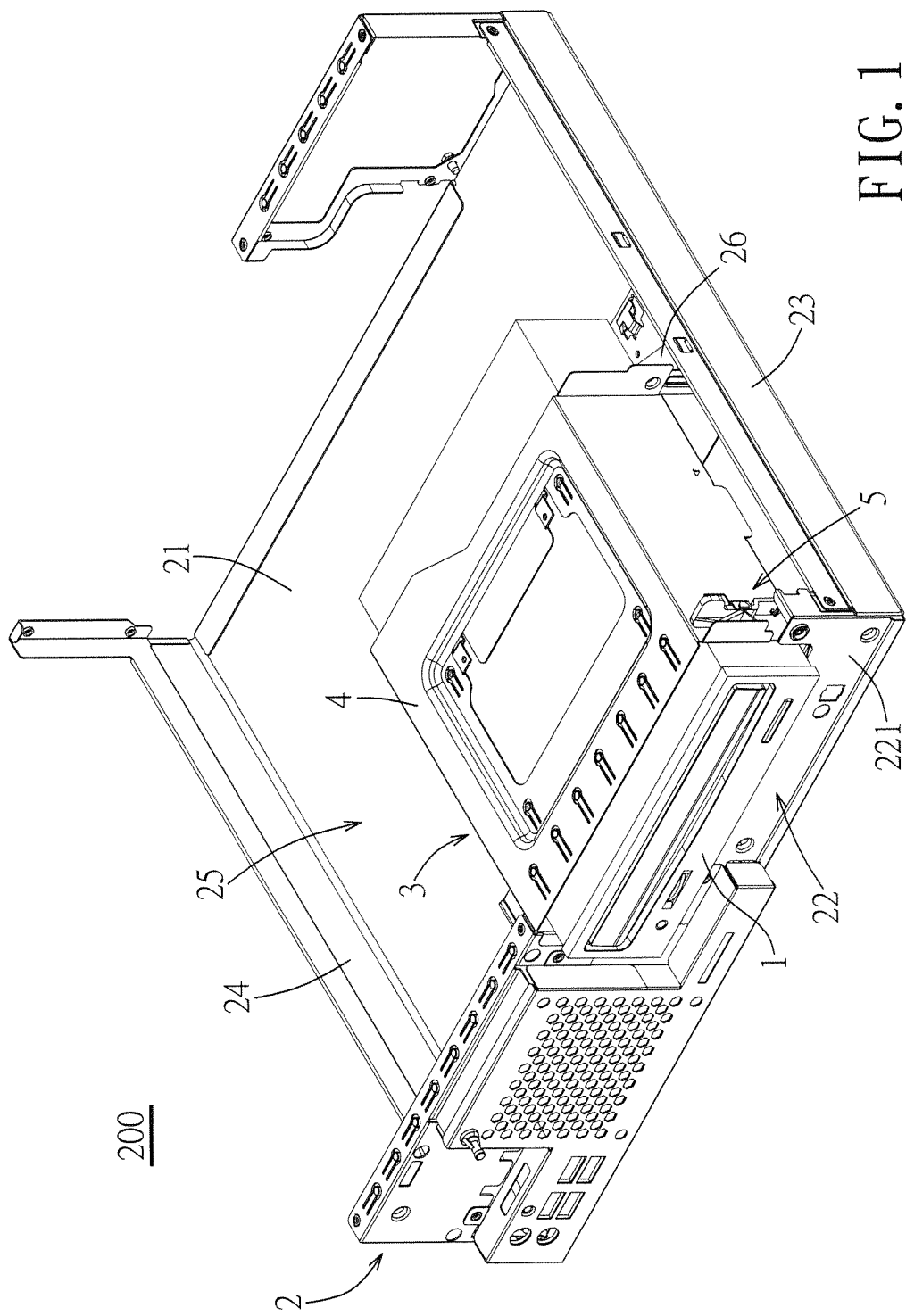
FIG. 1 is a perspective view illustrating a first embodiment of a housing according to the disclosure.

Before the disclosure is described in greater detail, it should be noted that like elements are denoted by the same reference numerals throughout the disclosure.

FIG. 1 illustrates a first embodiment of a housing 200 according to the present disclosure. The housing 200 is suitable for mounting an electronic component 1. In this embodiment, the housing 200 is exemplified as a computer housing, and the electronic component 1 is exemplified as a disk drive. The electronic component 1 may be a hard disk drive or an optical disk drive. In some embodiments, the housing 200 may be a server housing or housing of other electronic products, while the electronic component 1 may be other type of electronic components.

Figure 2:
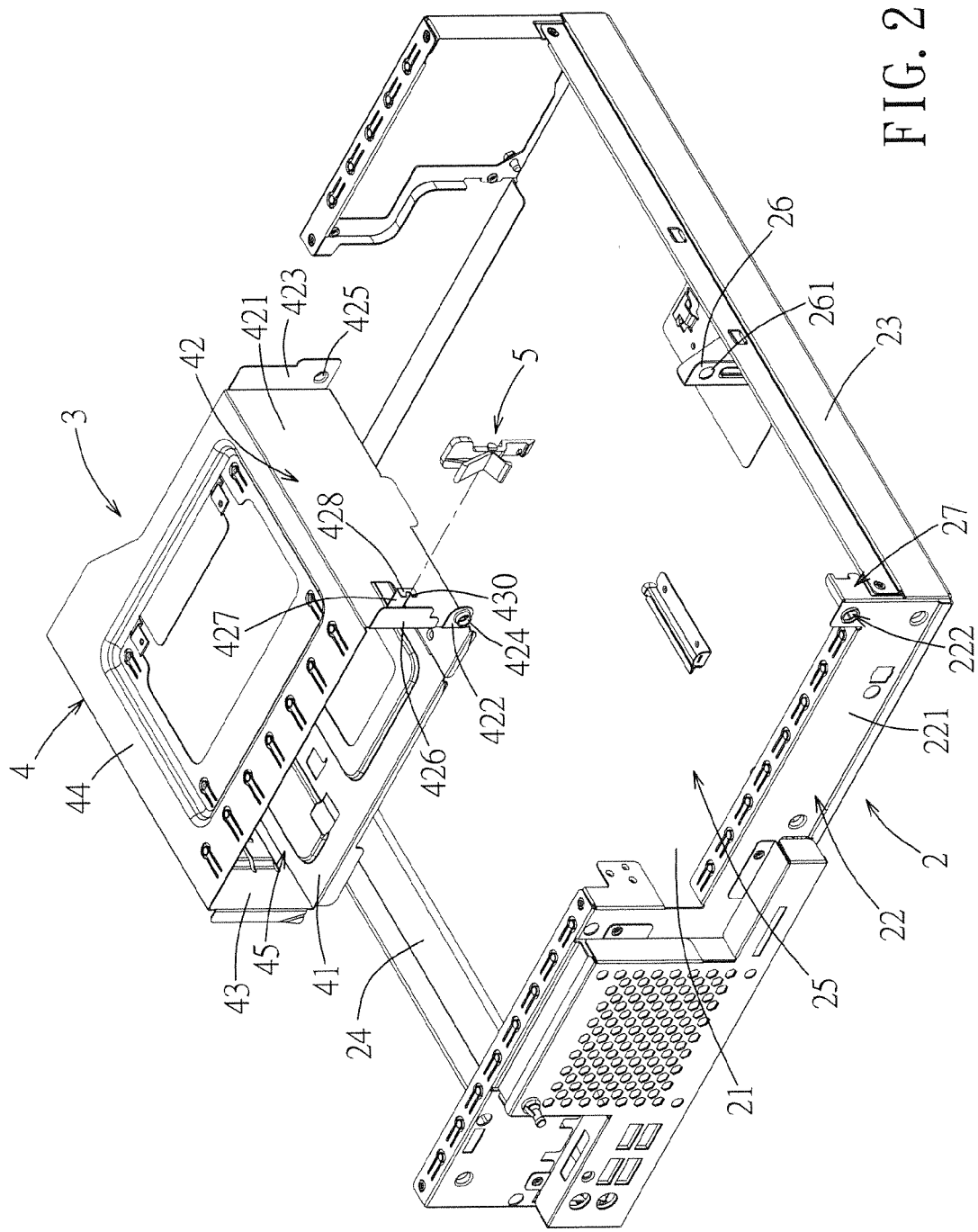
FIG. 2 is an exploded perspective view illustrating an assembly relationship of a housing body, a carrier frame and a latching assembly of the first embodiment.
Figure 3:
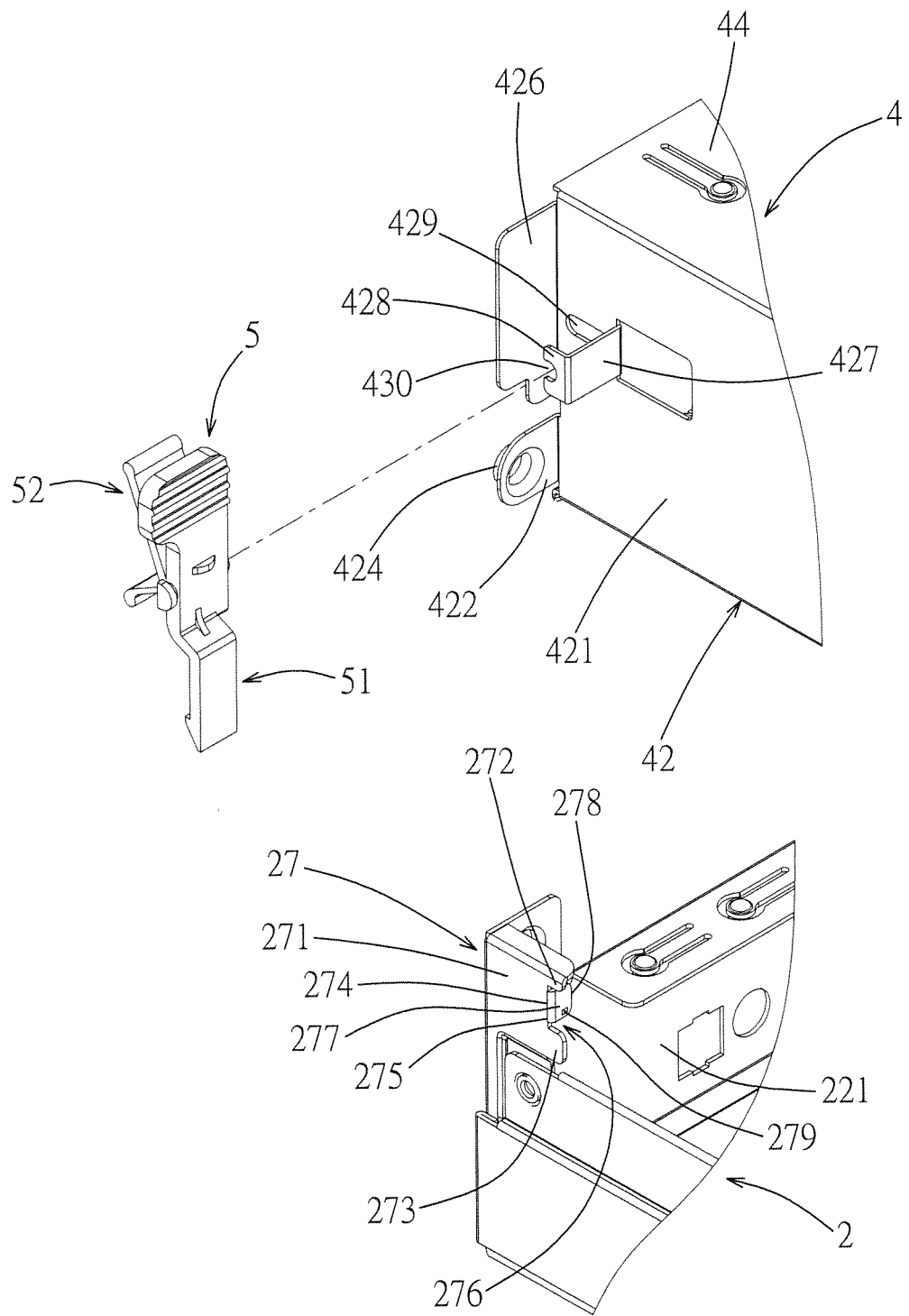
FIG. 3 is an enlarged fragmentary exploded perspective view of the housing body, the carrier frame and the latching assembly of the first embodiment.

Referring to FIGS. 1 to 3, the housing 200 includes a housing body 2 and a carrier device 3 disposed in the housing body 2. The housing body 2 includes a bottom plate 21, a front frame 22 disposed on a front end of the bottom plate 21, a left side plate 23 formed on a left side of the bottom plate 21 and a right side plate 24 formed on a right side of the bottom plate 21. The bottom plate 21, the front frame 22, and the left and right side plate s 23, 24 cooperatively define a receiving space 25 that is used for receiving a motherboard (not shown). The front frame 22 includes a front plate 221 formed with a front pivot hole 222. The housing body 2 further includes a bracket 26 that is fixedly connected to the bottom plate 21 and that is disposed in the receiving space 25, and a lateral protruding plate 27 connected to a left side of the front plate 221. The bracket 26 is spacedly disposed behind the front plate 221, is proximate to the left side plate 23, and is formed with a rear pivot hole 261 corresponding in position with the front pivot hole 222. The lateral protruding plate 27 is disposed on an inner side of and protrudes rearwardly from the front plate 221, and includes a main plate portion 271 having an end surface 274 that faces rearward, and an upper stop portion 272 and a lower stop portion 273 that extend outwardly, transversely and rearwardly from the end surface 274 and that are spaced apart from each other in a top-bottom direction. The end surface 274 and the upper and lower stop portions 272, 273 cooperatively define an engaging groove 275 having an opening 276 that faces rearward.

It should be noted that, although the lateral protruding plate 27 is exemplified as being connected to the left side of the front plate 221 in this embodiment, in other embodiments, the lateral protruding plate 27 may not be connected to the front plate 221. According to the requirement, the lateral protruding plate 27 may be independently disposed on any appropriate position between the front plate 221 and the bracket 26 and fixedly connected to the left side plate 23. Hence, the positioning of the lateral protruding plate 27 is not limited to the method disclosed in this embodiment.

The carrier device 3 includes a carrier frame 4 and a latching assembly 5. The carrier frame 4 includes a bottom wall 41, a pivoting sidewall 42 formed on a left side of the bottom wall 41, a sidewall 43 formed on a right side of the bottom wall 21, and a top wall 44 interconnecting top ends of the pivoting sidewall 42 and the sidewall 43. The bottom wall 41, the pivoting sidewall 42, the sidewall 43 and the top wall 44 cooperatively define a carrying space 45 having a shape and size matching that of the electronic component 1 for receiving and carrying the same. The pivoting sidewall 42 is rotatably pivoted to the housing body 2 and includes a side plate 421, a front pivot plate 422 and a rear pivot plate 423. The side plate 421 is connected between the bottom wall 41 and the top wall 44. The front pivot plate 422 projects outwardly and perpendicularly from a front end of the side plate 421, and has a front pivot 424 rotatably pivoted to the front pivot hole 222. The rear pivot plate 423 projects outwardly and perpendicularly from a rear end of the sideplate 421, is spaced rearwardly from the front pivot plate 422, and has a rear pivot 425 rotatably pivoted to the rear pivot hole 261. The rear pivot 425 and the front pivot 424 are coaxial. With the front and rear pivots 424, 425 respectively and rotatably pivoted to the front and rear pivot holes 222, 261, the carrier frame 4 is rotatable between a first position (see FIG. 1), where the carrier frame 4 is disposed in the receiving space 25 of the housing body 2, and a second position (see FIG. 8), where the carrier frame 4 is pivoted out of the receiving space 25 of the housing body 2.

The pivoting sidewall 42 further includes a projecting plate 426, a bridging plate 427 and a tab plate 428. The projecting plate 426 projects outwardly and perpendicularly from the front end of the side plate 421, and is spaced above the front pivot plate 422. The bridging plate 427 protrudes outwardly and transversely from the side plate 421, and is proximate to and spaced apart from the projecting plate 426. The tab plate 428 is bent transversely from a free end of the bridging plate 427 to extend toward the projecting plate 426, and is spaced apart from and parallel with the sideplate 421. The side plate 421 is formed with an elongated first hole 429 extending in a front-rear direction that is transverse to the top-bottom direction. In this embodiment, the tab plate 428 is formed with a second hole 430 that has a semi-circular shape with an opening that opens toward the projecting plate 426.

Figure 4:
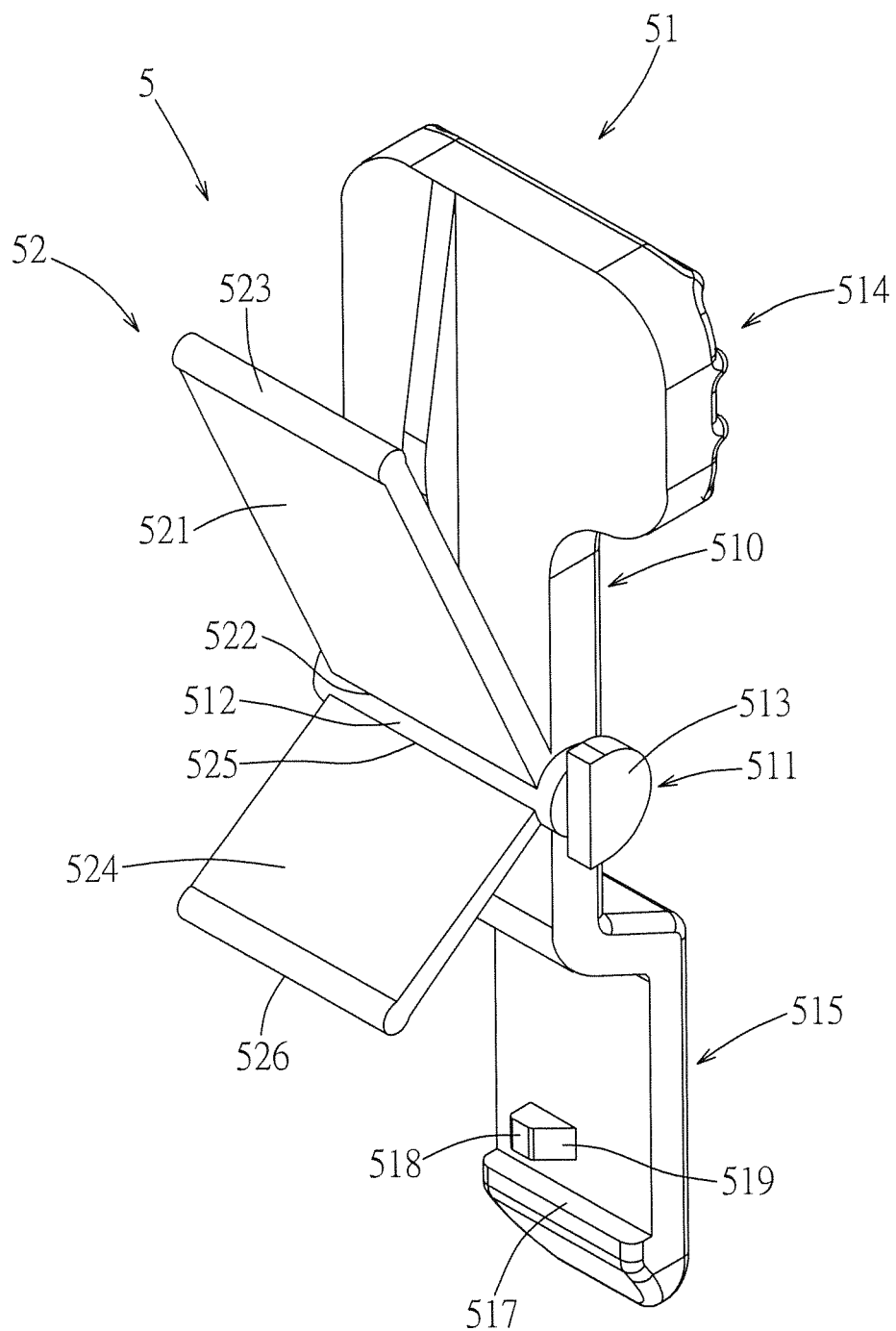
FIG. 4 is an enlarged perspective view of the latching assembly of the first embodiment.
Figure 5:
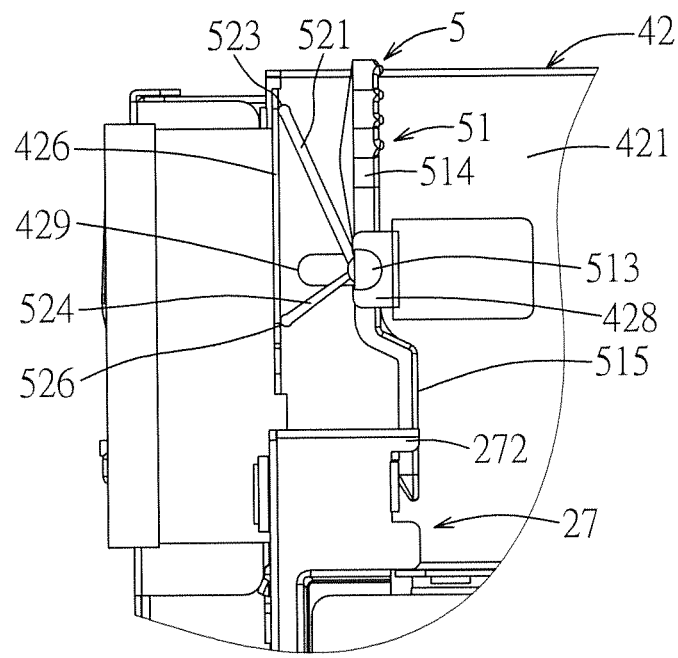
FIG. 5 is an enlarged fragmentary schematic view of the first embodiment, illustrating the carrier frame in a first position and a latching member of the latching assembly in a release position.

Referring to FIGS. 3 to 5, the latching assembly 5 is disposed on the pivoting sidewall 42, and includes a latching member 51 and a resilient biasing member 52. The latching member 51 is movably connected to the pivoting sidewall 42, and is releasably engageable with the engaging groove 275 of the lateral protruding plate 27. The latching member 51 is movable between an engagement position (see FIG. 9), where the latching member 51 is engaged with the engaging groove 275, and a release position (see FIG. 11), where the latching member 51 is disengaged from the engaging groove 275. When the latching member 51 is engaged with the engaging groove 275, the carrier frame 4 is positioned at the second position. In this embodiment, the latching member 51 is a lever structure disposed between the side plate 421 and the tab plate 428, and includes an elongated plate body 510 parallel to the projecting plate 426, and a connection shaft 511 formed on the elongated plate body 510 and having an axis extending in a left-right direction.

Concretely speaking, the connection shaft 511 includes a shaft portion 512 and a block portion 513. The shaft portion 512 is formed on a middle portion of the elongated plate body 510, and has left and right ends that protrude outwardly and respectively from left and right sides of the elongated plate body 510 and that are inserted movably, rotatably and respectively into the first and second holes 429, 430. The block portion 513 is formed on the left end of the shaft portion 512, and has a semi-circular shape with an outer diameter greater than an outer diameter of the shaft portion 512. Further, the block portion 513 is disposed on an outer side of and is blocked by the tab plate 428 so as to prevent the latching member 51 from moving in the left-right direction between the side plate 421 and the tab plate 428. The elongated plate body 510 includes a force-applying arm 514 that is disposed on an upper side of the shaft portion 512 and that is pressable, and a latching arm 515 disposed on a lower side of the shaft portion 512 for releasable engagement with the engaging groove 275. That is, the force-applying arm 514 and the latching arm 515 are respectively located on diametrically opposite sides of the connection shaft 511. The upper and lower stop portions 272, 273 respectively abut against and clamp therebetween two opposite sides of the latching arm 515 when the latching arm 515 is engaged to the engaging groove 275. Through this, the latching arm 515 is prevented from moving upwardly and downwardly between the upper and lower stop portions 272, 273 so as to position the latching member 51 at the engagement position.

In order to further increase the stability of engagement of the latching arm 515 with the engaging groove 275, the lateral protruding plate 27 of this embodiment further includes a bent portion 277 bent inwardly and transversely from the main plate portion 271 at the end surface 274. The bent portion 277 has a terminal edge 278 opposite to the end surface 274, and an aperture 279 formed between the end surface 274 and the terminal edge 278. The latching arm 515 has a hook end 517 for engagement with the terminal edge 278 of the bent portion 277. Accordingly, the stability of engagement of the latching arm 515 with the engaging groove 275 can be enhanced, and the latching arm 515 can be prevented from being easily disengaged from the engaging groove 275 through the opening 276.

Figure 6:
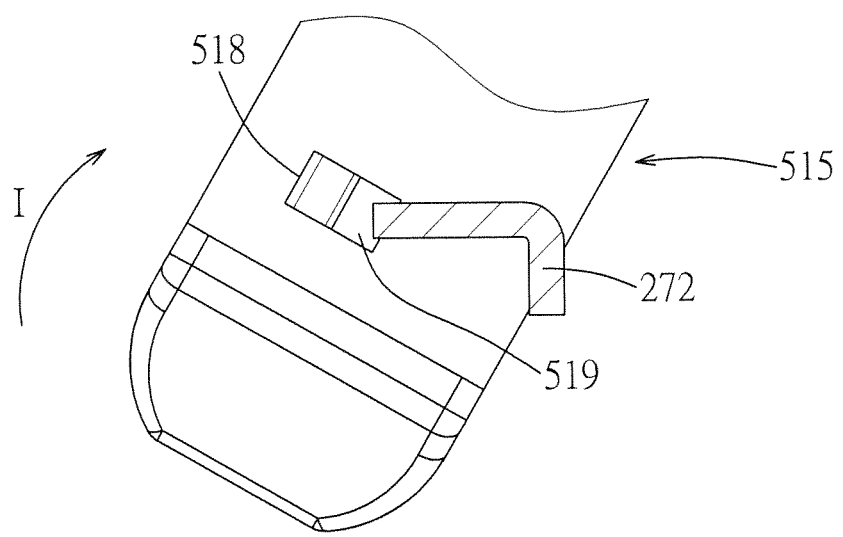
FIG. 6 is an enlarged fragmentary schematic view of a latching arm of the latching member, illustrating an inclined surface of a protruding block of the latching arm pressingly contacting an upper stop portion of a lateral protruding plate of the housing body.
Figure 7:
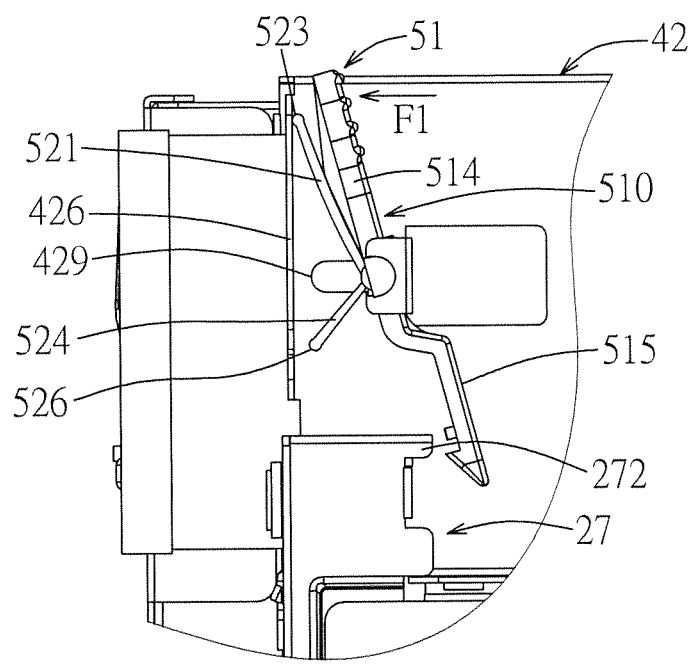
FIG. 7 is a view similar to FIG. 5, but illustrating the latching arm of the latching member being rotated away from a projecting plate of a pivoting sidewall of the carrier frame when a force-applying arm of the latching member is pressed toward projecting plate.

As shown in FIGS. 4 and 6, the latching arm 515 further has a protruding block 518 protruding therefrom. The protruding block 518 has an inclined surface 519 to pressingly contact an inner side of the upper stop portion 272. Since the upper stop portion 272 is located on a rotation path of the protruding block 518 of the latching arm 515, when the carrier frame 4 is rotated from the first position to the second position, the inclined surface 519 pressingly contacts the inner side of the upper stop portion 272, and the upper stop portion 272, in turn, applies a force against the inclined surface 519 to urge the latching arm 515 to rotate away from the projecting plate 426 and to smoothly pass over the inner side of the upper stop portion 272.

The resilient biasing member 52 is disposed between the projecting plate 426 and the latching member 51 to bias the latching member 51 to the engagement position. In this embodiment, the resilient biasing member 52 includes a first resilient plate 521 that is integrally formed in one piece with the shaft portion 512 of the connection shaft 511. The first resilient plate 521 and the force-applying arm 514 form an included angle therebetween. The first resilient plate 521 has a first connection end 522 integrally connected to the shaft portion 512, and a free end 523 opposite to the first connection end 522 and abutting against the projecting plate 426. When the force-applying arm 514 is pressed to rotate toward the projecting plate 426, the first resilient plate 521 is squeezed by the elongated plate body 510 and the projecting plate 426 so as to deform and store a restoring force. When the pressing force applied to the force-applying arm 514 is released, the restoring force of the first resilient plate 521 can drive the elongated plate body 510 to restore to its original position which is parallel to the projecting plate 426.

In addition, the resilient biasing member 52 further includes a second resilient plate 524 that is integrally formed in one piece with the shaft portion 512 of the connection shaft 511. The second resilient plate 524 and the latching arm 515 form an included angle therebetween. The second resilient plate 524 has a second connection end 525 integrally connected to the shaft portion 512, and a free end 526 opposite to the second connection end 525 and abutting against the projecting plate 426. The second resilient plate 524 is disposed below and cooperates with the first resilient plate 521 to form a substantially "V" shape. By the disposition of the second resilient plate 524, the stability of the assembly of the latching member 51 between the sideplate 421 and the tab plate 428 can be enhanced, so that the latching member 51 can be stably positioned in the release position, as shown in FIG. 5.

To assemble the latching assembly 5 to the pivoting sidewall 42, the shaft portion 512 of the connection shaft 511 is first aligned with the first hole 429, and the first and second resilient plates 521, 524 are pressed respectively toward the force-applying arm 514 and the latching arm 515, so that the first and second resilient plates 521, 524 are deformed to store restoring forces. Then, the right end of the shaft portion 512 is inserted into the first hole 429, and the pressing force applied to the first and second resilient plates 521, 524 are released so that the free ends 523, 526 of the first and second resilient plates 521, 524 can abut against the projecting plate 426. Afterward, the latching member 51 can be driven to slide rearward along the first hole 429 toward the rear pivot plate 423 through the restoring forces of the first and second resilient plates 521, 524, or the latching member 51 can be pushed rearwardly to slide along the first hole 429 toward the rear pivot plate 423. As such, the left end of the shaft portion 512 can be quickly inserted into the second hole 430. At this time, the block portion 513 is disposed on the outer side of the tab plate 428, and the assembling of the latching assembly 5 to the pivoting sidewall 42 is completed.

The latching assembly 5 of this embodiment is a single component made by an integral molding process using a plastic or metal material. As such, the resilient biasing member 52 is integrally formed in one piece with the latching member 51. Since the manufacturing method and the structure of the latching assembly 5 are relatively simple, the manufacturing duration and the fabrication cost of the latching assembly 5 can be significantly reduced. In addition, because the latching assembly 5 is a single component, and because of the assembly method between the latching assembly 5 and the pivoting sidewall 42, the latching assembly 5 can be conveniently and quickly assembled and positioned to the pivoting sidewall 42.

With reference to FIGS. 1 and 5, when the carrier frame 4 is in the first position, through the biasing of the first and second resilient plates 523, 524, the latching member 51 can be stably positioned at the release position.

To rotate the carrier frame 4 from the first position to the second position, two operating methods described below can be performed.

With reference to FIGS. 3 to 6 and 8, the first operating method is to directly rotate the carrier frame 4 from the first position to the second position along the direction of an arrow (I). Since the upper stop portion 272 is located on a rotation path of the protruding block 518 of the latching arm 515, when the carrier frame 4 is rotated until the inclined surface 519 of the protruding block 518 pressingly contacts the inner side of the upper stop portion 272, the upper stop portion 272, in turn, applies a force against the inclined surface 519 to urge the latching arm 515 to rotate away from the projecting plate 426 and smoothly pass over the inner side of the upper stop portion 272 and to move the force-applying arm 514 toward the projecting plate 426. During rotation of the latching member 51, since the free end 523 of the first resilient plate 521 abuts against the projecting plate 426, the first resilient plate 521 is squeezed by the elongated plate body 510 and the projecting plate 426 so as to deform and store a restoring force.

Figure 8:
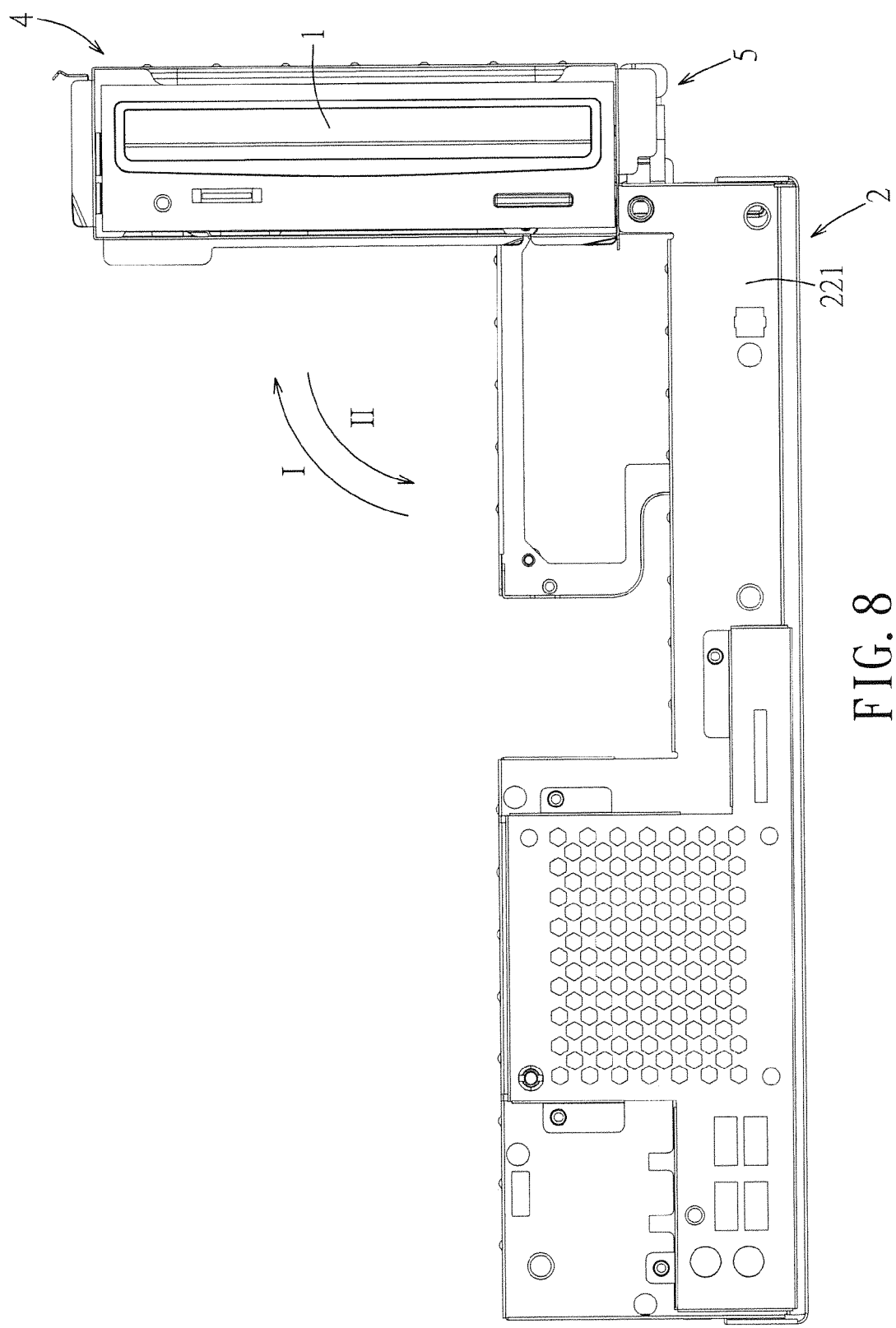
FIG. 8 is a front view of the first embodiment, illustrating the carrier frame in a second position.
Figure 9:
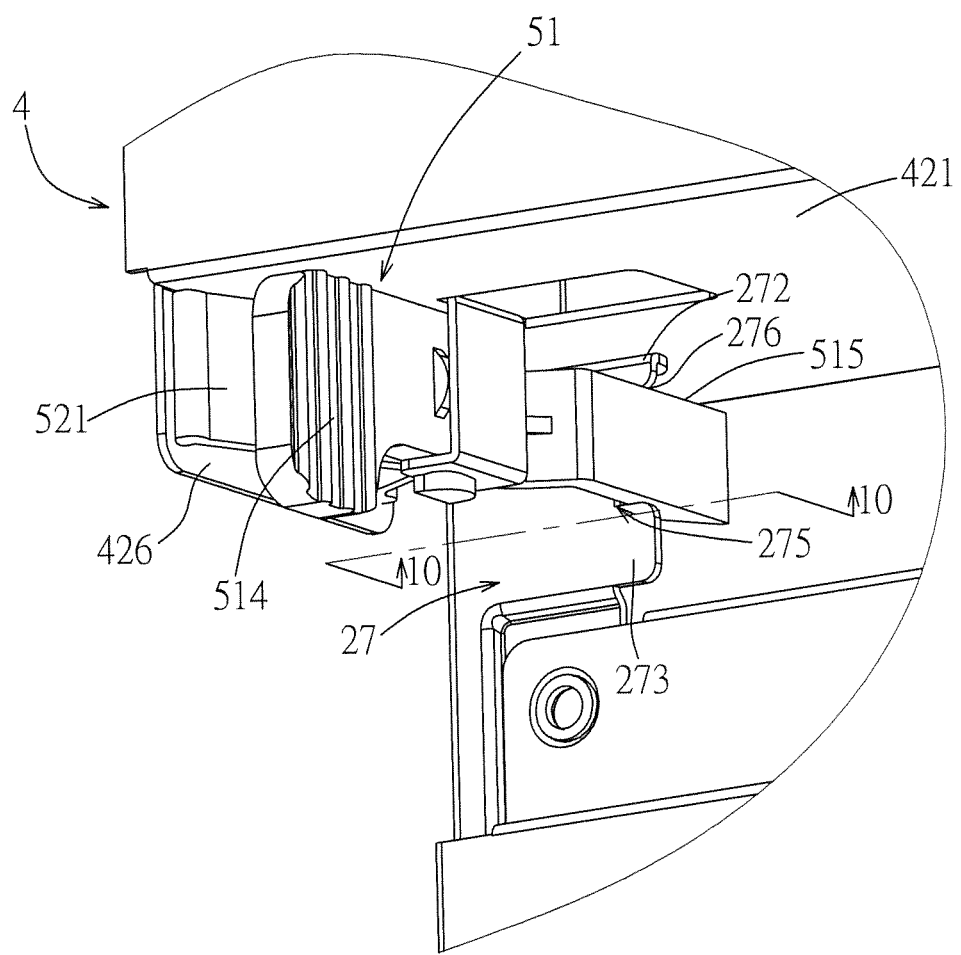
FIG. 9 is an enlarged fragmentary view of the first embodiment, illustrating the latching member in an engagement position when the carrier frame is in the second position.
Figure 10:
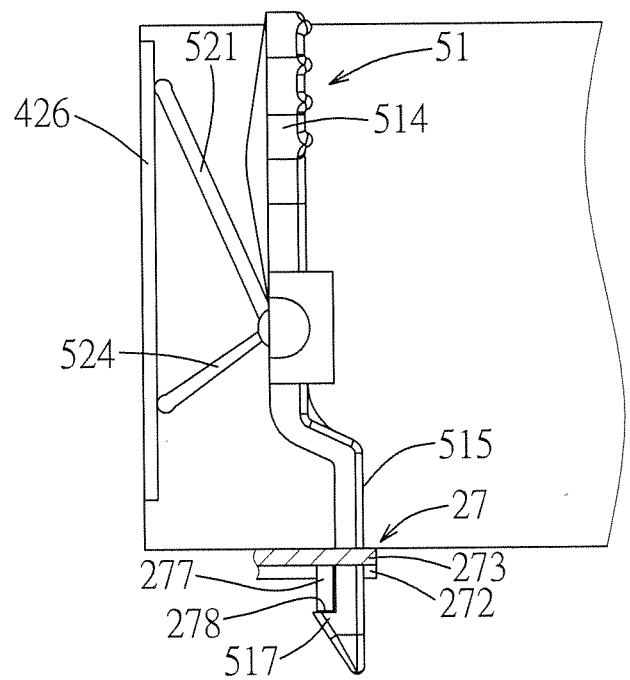
FIG. 10 is a sectional view taken along line 10-10 of FIG. 9, illustrating the latching arm being engaged to the engaging groove and a hook end of the latching arm being engaged to a terminal edge of a bent portion of the lateral protruding plate.

Referring to FIGS. 8 to 10, when the carrier frame 4 is rotated to the second position, as shown in FIG. 8, by the restoring force of the first resilient plate 521, the latching arm 515 can be automatically inserted into the engaging groove 275 via the opening 276. Consequently, the hook end 517 of the latching arm 515 is engaged with the terminal edge 278 of the bent portion 277, and the protruding block 518 is received in the aperture 279. With the latching arm 515 clamped between the upper and lower stop portions 272, 273 and with the hook end 517 engaged to the terminal edge 278, the latching member 51 can be stably positioned at the engagement position at this time.

With reference to FIGS. 7 to 10, the second operating method is to first press the force-applying arm 514 of the latching member 51 in the direction of an arrow (F1) to move the force-applying arm 514 toward the projecting plate 426 and the latching arm 515 away from the projecting plate 426, simultaneously. With the rearward movement of the latching arm 515 away from the projecting plate 426, the latching arm 515 is prevented from being blocked by the lateral protruding plate 27 during rotation of the latching assembly 5 together with the carrier frame 4. During the rotation of the latching assembly 5, the first resilient plate 521 is squeezed by the elongated plate body 510 and the projecting plate 426 so as to deform and store a restoring force. When the carrier frame 4 is rotated to the second position, the latching arm 515 faces the engaging groove 275, after which the pressing force applied to the force-applying arm 514 is released. By the restoring force of the first resilient plate 521 that restores the elongated plate body 510 to its original position which is parallel to the projecting plate 426, the latching arm 515 is engaged to the engaging groove 275 via the opening 276, the hook end 517 of the latching arm 515 is engaged with the terminal edge 278 of the bent portion 277, and the protruding block 518 is received in the aperture 279.

When the latching member 51 is positioned at the engagement position, the carrier frame 4 can be stably positioned at the second position, and cannot instantly rotate to cover the housing body 2 when accidentally bumped by a person. When the carrier frame 4 is stably positioned at the second position, inspection, repair or replacement of electronic components in the receiving space 25 (see FIG. 2) of the housing body 2 or the electronic component 1 in the carrier frame 4 can be safely executed.

Figure 11:
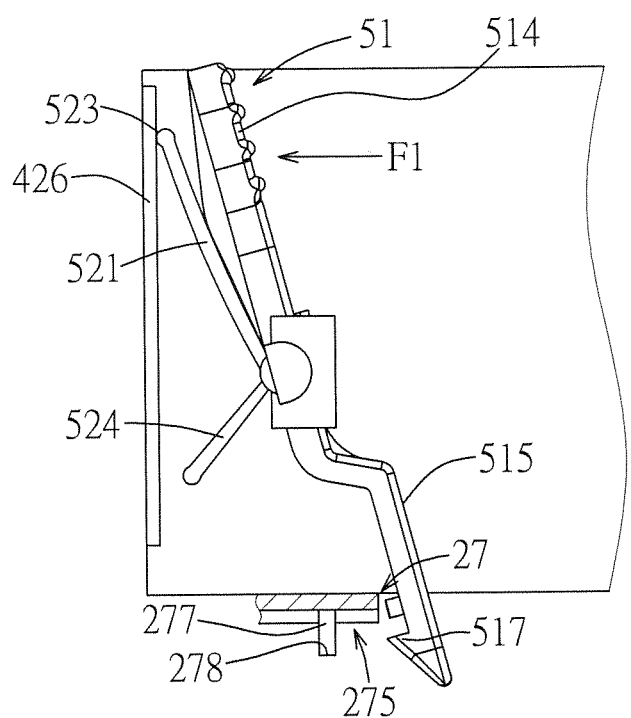
FIG. 11 is a view similar to FIG. 10, but illustrating the latching member being rotated to the release position.

Referring to FIG. 11, in combination with FIGS. 8 and 9, when it is desired to rotate the carrier frame 4 from the second position to the first position, the force-applying arm 514 is pressed in the direction of the arrow (F1) so as to move the force-applying arm 514 toward the projecting plate 426 and the latching arm 515 away from the projecting plate 426, simultaneously. At this time, the hook end 517 of the latching arm 515 is moved away from the terminal edge 278 of the bent portion 277, and the latching arm 515 is also moved away from the engaging groove 275 via the opening 276. When the latching member 51 is rotated to the release position, as shown in FIG. 11, the latching arm 515 cannot be blocked by the protruding plate 27 during rotation, and the carrier frame 4 can be rotated in the direction of an arrow (II) (see FIG. 8) from the second position back to the first position, as shown in FIG. 1.

Figure 12:
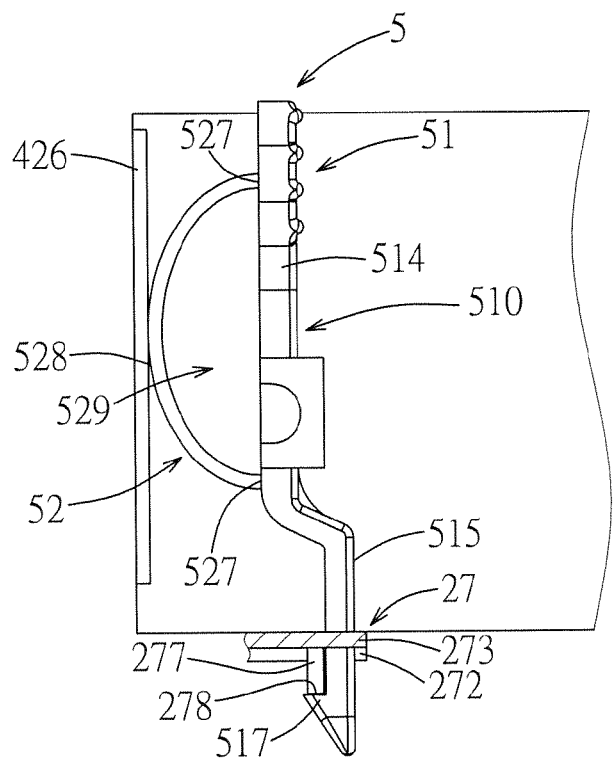
FIG. 12 is an enlarged fragmentary schematic view of a latching assembly of a housing according to a second embodiment of the disclosure, illustrating a latching member of the latching assembly in an engagement position.
Figure 13:
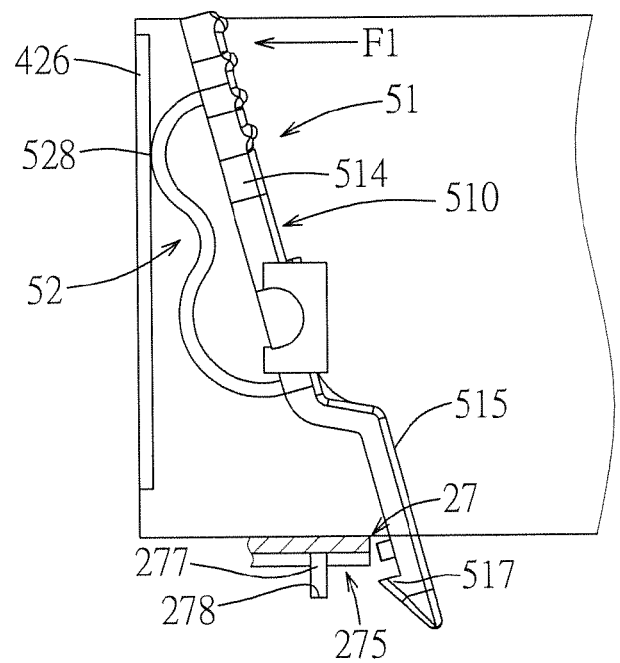
FIG. 13 is a view similar to FIG. 12, but illustrating how a resilient biasing member of the latching assembly is deformed when the latching member is rotated to a release position.

FIGS. 12 and 13 illustrate a second embodiment of a housing 200 according to the present disclosure. The overall structure and the operating method of the housing 200 are substantially similar to those described in the first embodiment. The difference between the first and second embodiments resides in the structure of the resilient biasing member 52 of the latching assembly 5.

In this embodiment, the resilient biasing member 52 is a curved resilient plate that is integrally formed in one piece with the elongated plate body 510 and that abuts against the projecting plate 426. The resilient biasing member 52 has a curved abutment surface 528 abutting against the projecting plate 426, and two connection ends 527 that are respectively disposed on two opposite ends of the curved abutment surface 528 and that are respectively connected to the force-applying arm 514 and the latching arm 515.

The carrier frame 4 can be rotated from the first position to the second position using the two operating methods described in the first embodiment. In the aforesaid operating methods, when the force-applying arm 514 is rotated toward the projecting plate 426, the curved abutment surface 528 is squeezed by the elongated plate body 510 and the projecting plate 426 so as to deform and store a restoring force. When the carrier frame 4 is rotated to the second position, through the restoring force of the resilient biasing member 52 that restores the elongated plate body 510 to its original position, the latching arm 515 is engaged to the engaging groove 275, thereby positioning the latching member 51 at the engagement position. To disengage the latching arm 515 from the engaging groove 275, the force-applying arm 514 is pressed along the direction of an arrow (F1) to move the latching member 51 to the release position, as shown in FIG. 13. At this time, the carrier frame 4 can be rotated from the second position to the first position.

Figure 14:
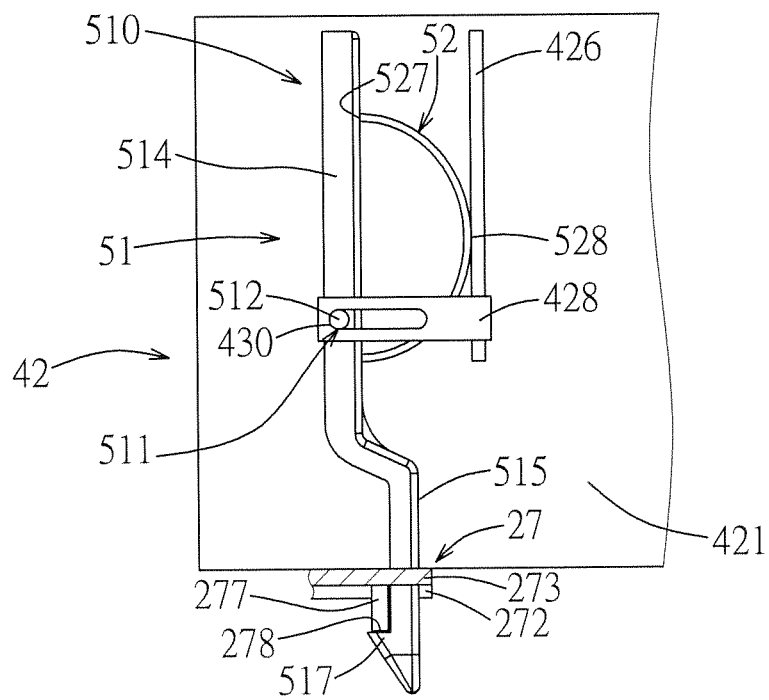
FIG. 14 is an enlarged fragmentary schematic view of a latching assembly of a housing according to a third embodiment of the disclosure, illustrating a latching member of the latching assembly in an engagement position and a connection shaft of the latching member being slidable in a second hole of a tab plate.
Figure 15:
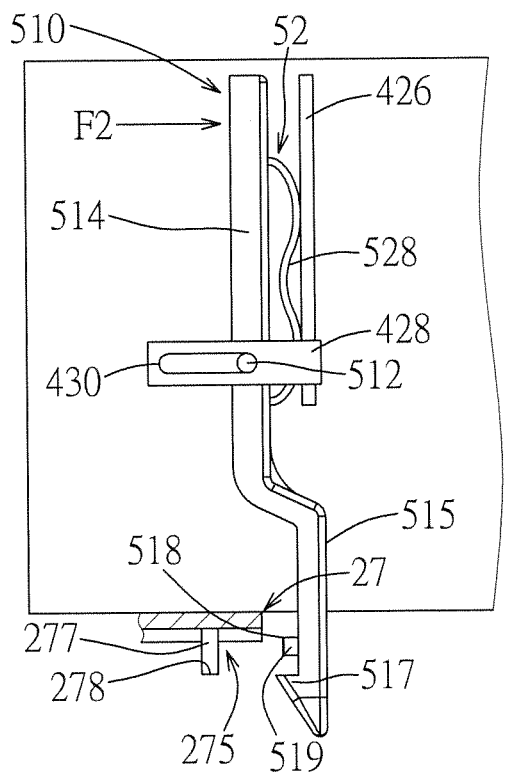
FIG. 15 is a view similar to FIG. 14, but illustrating how a resilient biasing member of the latching assembly is deformed when the latching member is moved to a release position.

FIGS. 14 and 15 illustrate a third embodiment of a housing 200 according to the present disclosure. The overall structure and the operating method of the housing 200 are similar to those described in the first embodiment. The difference between the first and third embodiments resides in the connection between the connection shaft 511 and the pivoting sidewall 42 and the structure of the resilient biasing member 52 of the latching assembly 5.

In this embodiment, the projecting plate 426 is disposed spaced apart from and behind the front end of the side plate 421, and the tab plate 428 extends forwardly from an outer side of the projecting plate 426. Hence, the bridging plate 427 is dispensed with. The second hole 430 in the tab plate 428 has a shape similar to that of the first hole 429 (see FIG. 3) which is elongated, and extends in the front-rear direction. The block portion 513 (see FIG. 4) of the connection shaft 511 is dispensed with, and the two opposite ends of the shaft portion 512 of the connection shaft 511 are slidably and respectively received in the first and second holes 429, 430. The resilient biasing member 52 of this embodiment has a structure similar to the second embodiment. Particularly, the resilient biasing member 52 has a curved abutment surface 528 abutting against the projecting plate 426, and two connection ends 527 that are respectively disposed on two opposite ends of the curved abutment surface 528 and that are connected to the elongated plate body 510.

The carrier frame 4 can be rotated from the first position to the second position using the two operating methods described in the first embodiment. When the carrier frame 4 is rotated until the inclined surface 519 of the protruding block 518 pressingly contact the inner side of the upper stop portion 272, the upper stop portion 272 applies a force against the inclined surface 519 to urge the latching member 51 to slide rearward along the first and second holes 429, 430 toward the projecting plate 426. Alternatively, the force-applying arm 514 can be pressed along the direction of an arrow (F2) toward the projecting plate 426 to slide the latching member 51 rearwardly along the first and second holes 429, 430. As such, the latching arm 515 can be prevented from being blocked by the lateral protruding plate 27 during rotation of the latching assembly 5 together with the carrier frame 4. During the rearward sliding movement of the latching member 51, the resilient biasing member 52 is squeezed by the elongated plate body 510 and the projecting plate 426 so as to deform and store a restoring force. When the carrier frame 4 is rotated to the second position, through the restoring force of the resilient biasing member 52 that restores the elongated plate body 510 to its original position, the latching member 51 can be positioned at the engagement position. To release engagement between the latching arm 515 and the engaging groove 275, the force-applying arm 514 is pressed along the direction of the arrow (F2) to slide the latching member 51 to the release position, as shown in FIG. 15. At this time, the carrier frame 4 can be rotated from the second position to the first position.

Figure 16:
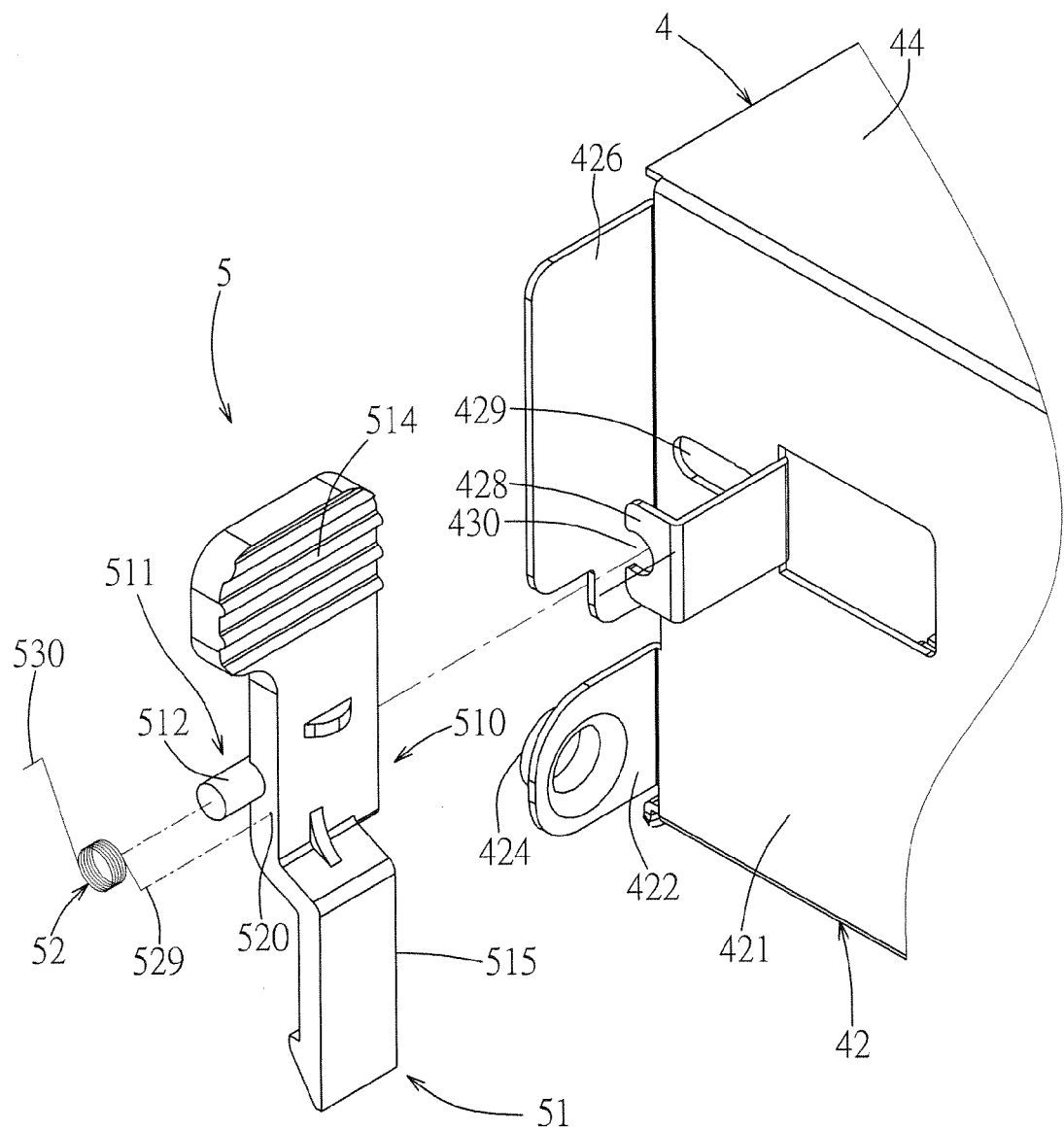
FIG. 16 is an enlarged fragmentary exploded perspective view of a fourth embodiment of a housing according to the disclosure.
Figure 17:
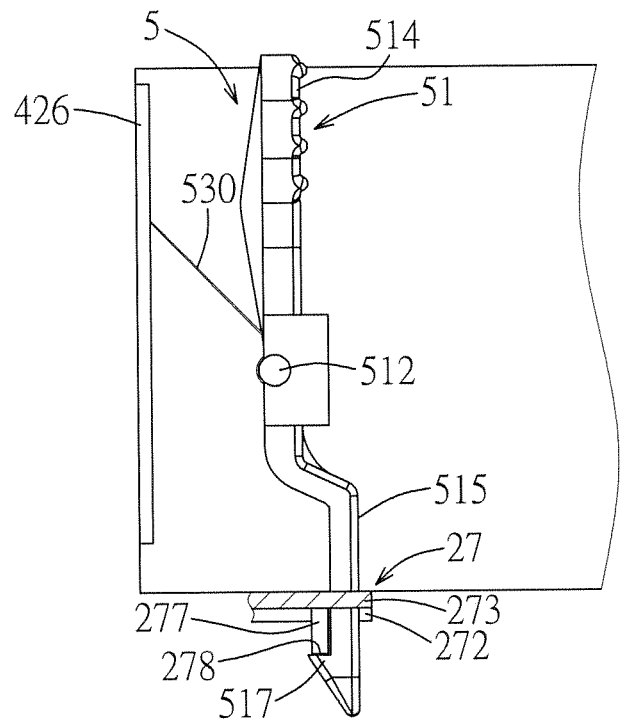
FIG. 17 is an enlarged fragmentary schematic view of a latching assembly of the fourth embodiment, illustrating a latching member of the latching assembly in an engagement position.
Figure 18:
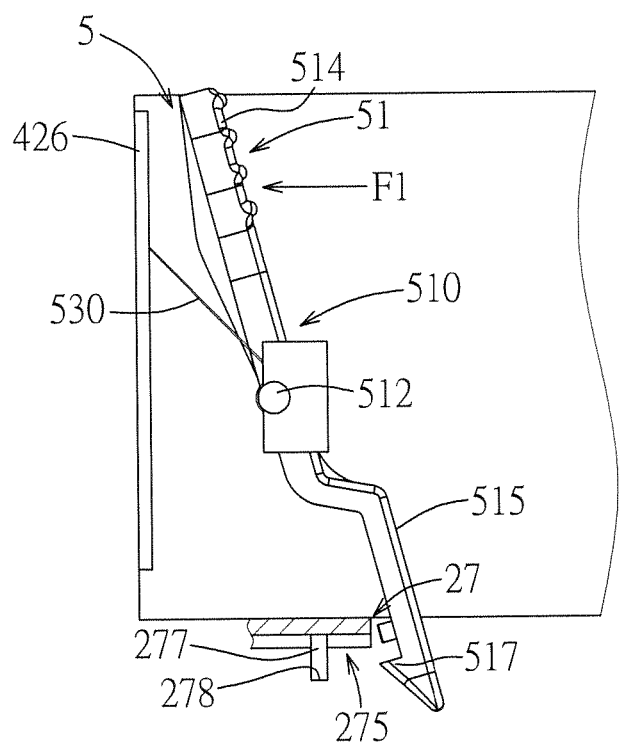
FIG. 18 is a view similar to FIG. 17, but illustrating how a resilient biasing member of the latching assembly is deformed when the latching member is rotated to a release position.

FIGS. 16 to 18 illustrate a fourth embodiment of a housing 200 according to the present disclosure. The overall structure and the operating method of the housing 200 are similar to those described in the first embodiment. The difference between the first and fourth embodiments resides in the structure of the resilient biasing member 52 of the latching assembly 5.

In this embodiment, the block portion 513 of the connection shaft 511 is dispensed with, and a left side of the latching arm 515 is formed with a fixing hole 520 proximate to the shaft portion 512 of the connection shaft 511. The resilient biasing member 52 is a torsion spring that is sleeved on the connection shaft 511 and that includes a connection arm 529 fixedly connected to the fixing hole 520, and an abutment arm 530 abutting against the projecting plate 426.

The carrier frame 4 can be rotated from the first position to the second position using the two operating methods described in the first embodiment. When the force-applying arm 514 is pressed toward the projecting plate 426, the resilient biasing member 52 is squeezed by the elongated plate body 510 and the projecting plate 426 so as to deform and store a restoring force. When the carrier frame 4 is rotated to the second position, through the restoring force of the resilient biasing member 52 that restores the elongated plate body 510 to its original position, the latching arm 515 is engaged to the engaging groove 275 to position the latching member 51 at the engagement position. To release engagement between the latching arm 515 and the engaging groove 275, the force-applying arm 514 is pressed along the direction of the arrow (F1) to rotate the latching arm 51 to the release position, as shown in FIG. 18. At this time, the carrier frame 4 can be rotated from the second position to the first position.

Figure 19:
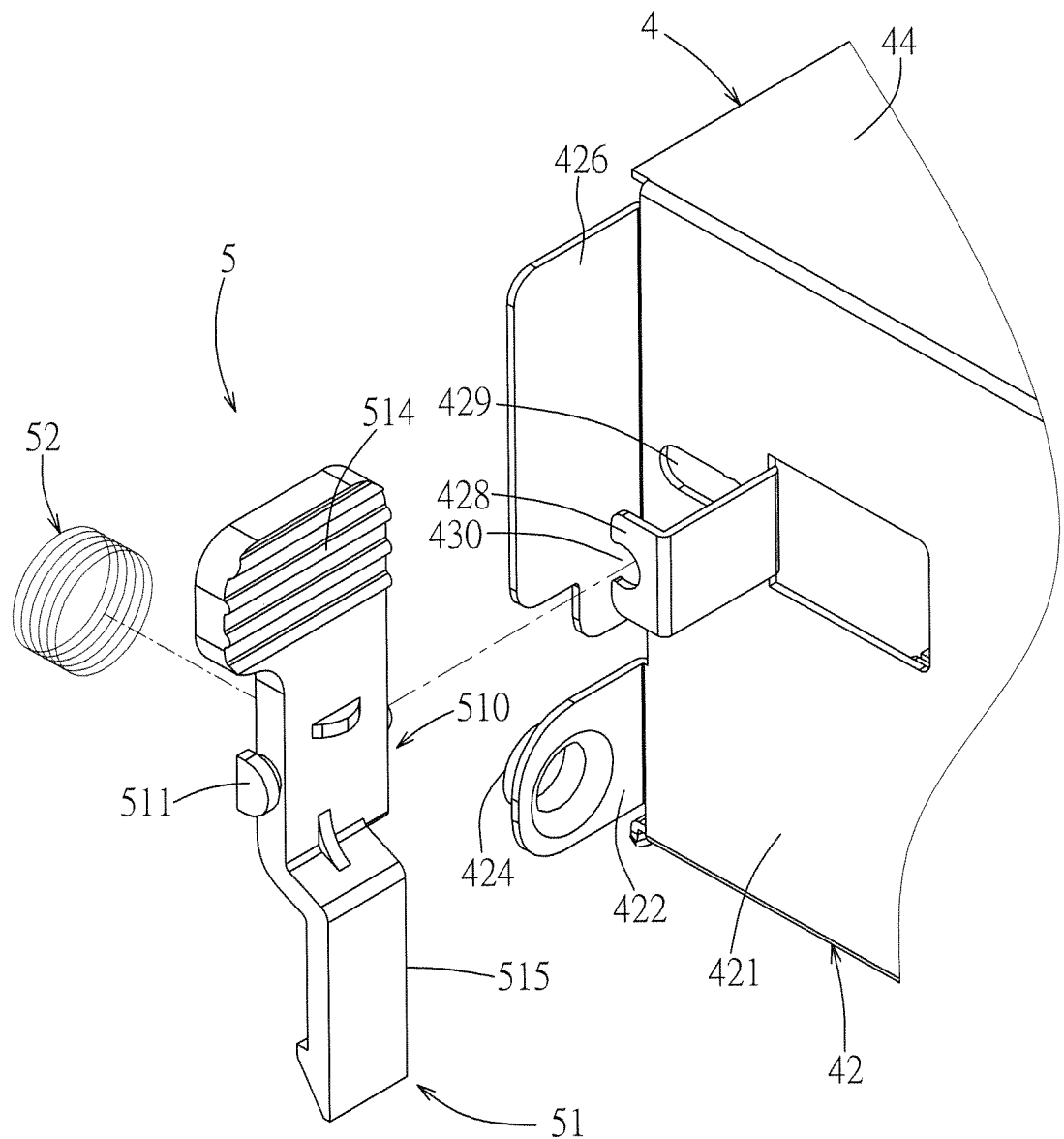
FIG. 19 is an enlarged fragmentary exploded perspective view of a fifth embodiment of a housing according to the disclosure.
Figure 20:
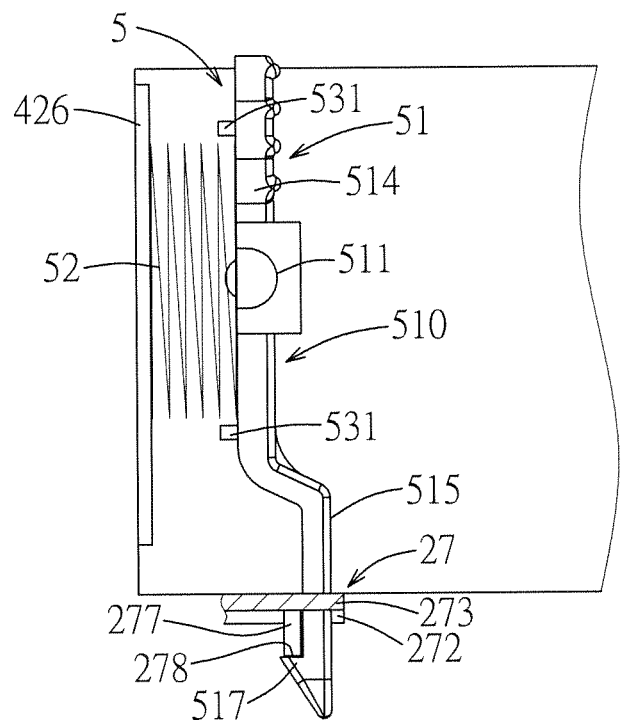
FIG. 20 is an enlarged fragmentary schematic view of a latching assembly of the fifth embodiment, illustrating a latching member of the latching assembly in an engagement position.
Figure 21:
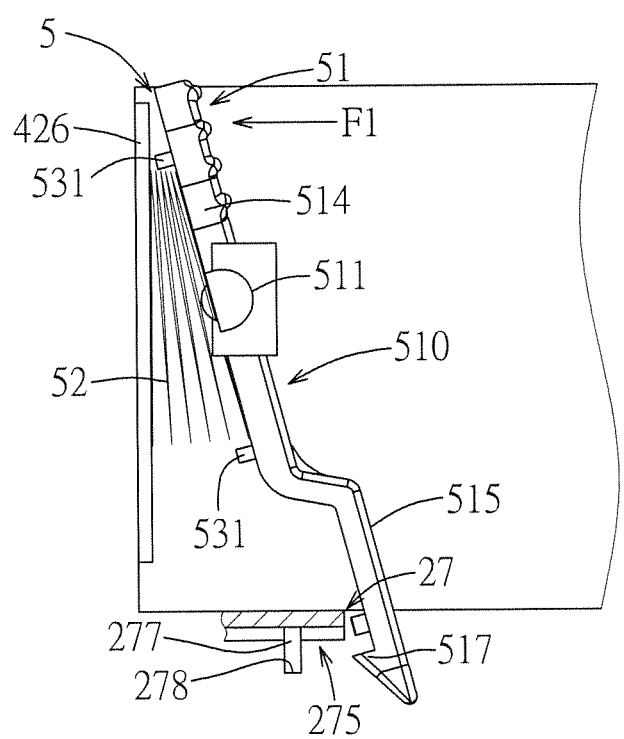
FIG. 21 is a view similar to FIG. 20, but illustrating how a resilient biasing member of the latching assembly is deformed when the latching member is rotated to a release position.

FIGS. 19 to 21 illustrate a fifth embodiment of a housing 200 according to the present disclosure. The overall structure and the operating method of the housing 200 are similar to those described in the first embodiment. The difference between the first and fifth embodiments resides in the structure of the resilient biasing member 52 of the latching assembly 5.

In this embodiment, the resilient biasing member 52 is a compression spring that has two opposite ends respectively abutting against the elongated plate body 510 and the projecting plate 426. The latching member further includes two protuberances 531 that respectively protrude from the force-applying arm 514 and the latching arm 515 of the elongated plate body 510 in proximity to the connection shaft 511. The resilient biasing member 52 is disposed between the protuberances 531.

The carrier frame 4 can be rotated from the first position to the second position using the two operating methods described in the first embodiment. In the aforesaid operating methods, when the force-applying arm 514 is pressed along the direction of the arrow (F1), the resilient biasing member 52 is squeezed by the elongated plate body 510 and the projecting plate 426 so as to deform and restore a restoring force. When the carrier frame 4 is rotated to the second position, through the restoring force of the resilient biasing member 52 that restores the elongated plate body 510 to its original position, the latching arm 515 can be engaged to the engaging groove 275 to position the latching member 51 at the engagement position. To release engagement between the latching arm 515 and the engaging groove 275, the force-applying arm 514 is pressed along the direction of the arrow (F1) to rotate the latching member 51 to the release position, as shown in FIG. 21. At this time, the carrier frame 4 can be rotated from the second position to the first position.

It should be noted that the resilient biasing member 52 of the third embodiment is not limited to the curved resilient plate. Alternatively, the resilient biasing member 52 of the third embodiment may be a torsion spring as depicted in the fourth embodiment or a compression spring as depicted in the fifth embodiment.

To sum up, through the design of the latching assembly 5, when the carrier frame 4 is rotated to the second position, it can be secured to the housing body 2 through the latching assembly 5, so that the carrier frame 4 can be stably positioned at the second position, thereby increasing the safety of operation and use thereof. Further, the manufacturing method and the structure of the latching assembly 5 are relatively simple, so that the manufacturing duration and the fabrication cost of the latching assembly 5 can be significantly reduced. As a result, the latching assembly 5 can be conveniently and quickly assembled and positioned to the pivoting sidewall 42. Moreover, the operation of the latching assembly 5 is easy and simple, so that it can be conveniently and quickly secured to or released from the housing body 2. Therefore, the object of the disclosure can be realized.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A housing for mounting of an electronic component, comprising:
a housing body including a lateral protruding plate, said lateral protruding plate including a main plate portion having an end surface, an upper stop portion and a lower stop portion that extend outwardly and transversely from said end surface and that are spaced apart from each other in a top-bottom direction, and a bent portion bent inwardly and transversely from said main plate portion at said end surface, said end surface and said upper and lower stop portions cooperatively defining an engaging groove; and
a carrier device disposed in said housing body and including
a carrier frame configured to carry an electronic component and including a pivoting sidewall rotatably pivoted to said housing body, said carrier frame being rotatable between a first position, where said carrier frame is disposed in said housing body, and a second position, where said carrier frame is pivoted out of said housing body, said pivoting sidewall including a side plate, and a projecting plate projecting outwardly and perpendicularly from said side plate, and
a latching assembly disposed on said pivoting sidewall and releasably engaged to said engaging groove so as to position said carrier frame at said second position;
wherein said latching assembly includes a latching member and a resilient biasing member, said latching member being movably connected to said pivoting sidewall, and being movable between an engagement position, where said latching member is engaged with said engaging groove, and a release position, where said latching member is disengaged from said engaging groove, said resilient biasing member being disposed between said projecting plate and said latching member, and being configured to bias said latching member to said engagement position;
wherein said latching member includes an elongated plate body, and a connection shaft formed on said elongated plate body and movably connected to said pivoting sidewall, said elongated plate body including a force-applying arm and a latching arm opposite to said force-applying arm and releasably engaged with said engaging groove, said latching arm having a hook end, said hook end engaging a terminal edge of said bent portion that is opposite to said end surface when said latching member is in said engagement position; and
wherein said upper and lower stop portions respectively abut against two opposite sides of said latching arm when said latching member is in said engagement position.

2. The housing as claimed in claim 1, wherein said resilient biasing member is integrally formed in one piece with said latching member.

3. The housing as claimed in claim 1, wherein said latching arm has a protruding block protruding therefrom, said protruding block having an inclined surface to pressingly contact an inner side of said upper stop portion, said latching member being movable relative to said pivoting sidewall when said inclined surface pressingly contacts said upper stop portion.

4. The housing as claimed in claim 1, wherein said pivoting sidewall further includes a bridging plate protruding outwardly and transversely from said side plate, and a tab plate that is bent transversely from a free end of said bridging plate and that is spaced apart from and parallel with said side plate, said side plate being formed with a first hole, said tab plate being formed with a second hole, said connection shaft being movably inserted into said first and second holes.

5. The housing as claimed in claim 4, wherein said connection shaft is rotatably pivoted to said first and second holes.

6. The housing as claimed in claim 5, wherein said latching member is a lever structure, said connection shaft being formed on a middle portion of said elongated plate body, said force-applying arm and said latching arm being respectively located on diametrically opposite sides of said connection shaft.

7. The housing as claimed in claim 4, wherein said first and second holes are elongated, and said connection shaft is slidable in said first and second holes.

8. The housing as claimed in claim 1, wherein said resilient biasing member includes a first resilient plate that is integrally formed in one piece with said connection shaft and that has a free end abutting against said projecting plate, said first resilient plate and said force-applying arm forming an included angle therebetween.

9. The housing as claimed in claim 8, wherein said resilient biasing member further includes a second resilient plate that is integrally formed in one piece with said connection shaft and that has a free end abutting against said projecting plate, said second resilient plate and said latching arm forming an included angle therebetween, said first and second resilient plates cooperatively forming a substantially "V" shape.

10. The housing as claimed in claim 9, wherein said first resilient plate further has a first connection end integrally connected to said connection shaft and opposite to said free end of said first resilient plate, and said second resilient plate further has a second connection end integrally connected to said connection shaft and opposite to said free end of said second resilient plate.

11. The housing as claimed in claim 1, wherein said resilient biasing member is a curved resilient plate that is integrally formed in one piece with said elongated plate body and that abuts against said projecting plate.

12. The housing as claimed in claim 11, wherein said resilient biasing member has a curved abutment surface abutting against said projecting plate, and two connection ends that are respectively disposed on two opposite ends of said curved abutment surface and that are connected to said elongated plate body.

13. The housing as claimed in claim 1, wherein said resilient biasing member is a torsion spring that is sleeved on said connection shaft and that includes a connection arm fixedly connected to said elongated plate body, and an abutment arm abutting against said projecting plate.

14. The housing as claimed in claim 1, wherein said resilient biasing member is a compression spring that has two opposite ends respectively abutting against said elongated plate body and said projecting plate.

15. The housing as claimed in claim 1, wherein said pivoting sidewall further includes a front pivot plate and a rear pivot plate disposed in longitudinally spaced relationship, said front pivot plate projecting outwardly and perpendicularly from a front end of said side plate, said rear pivot plate projecting outwardly and perpendicularly from a rear end of said side plate, said front and rear pivot plates having a respective front pivot and a rear pivot to thereby pivot said carrier frame out of said housing body in said second position.

16. A housing for mounting of an electronic component, comprising:
 a housing body formed with an engaging groove; and
 a carrier device disposed in said housing body and including
  a carrier frame configured to carry an electronic component and including a pivoting sidewall rotatably pivoted to said housing body, said carrier frame being rotatable between a first position, where said carrier frame is disposed in said housing body, and a second position, where said carrier frame is pivoted out of said housing body, said pivoting sidewall including a side plate, and a projecting plate projecting outwardly and perpendicularly from said side plate, said pivoting sidewall further including a bridging plate protruding outwardly and transversely from said side plate, and a tab plate being bent transversely from a free end of said bridging plate and being spaced apart from and parallel with said side plate, said side plate being formed with a first hole, said tab plate being formed with a second hole; and
  a latching assembly disposed on said pivoting sidewall and releasably engaged to said engaging groove so as to position said carrier frame at said second position;
 wherein said latching assembly includes a latching member and a resilient biasing member, said latching member being movably connected to said pivoting sidewall, and being movable between an engagement position, where said latching member is engaged with said engaging groove, and a release position, where said latching member is disengaged from said engaging groove, said resilient biasing member being disposed between said projecting plate and said latching member, and being configured to bias said latching member to said engagement position;
 wherein said latching member includes an elongated plate body, and a connection shaft formed on said elongated plate body and movably connected to said pivoting sidewall, said connection shaft being movably inserted into said first and second holes, said elongated plate body including a force-applying arm and a latching arm opposite to said force-applying arm and releasably engaged with said engaging groove, said latching arm having a hook end, said hook end engaging a terminal edge of said bent portion that is opposite to said end surface when said latching member is in said engagement position.

17. A housing for mounting of an electronic component, comprising:
 a housing body formed with an engaging groove; and
 a carrier device disposed in said housing body and including
  a carrier frame configured to carry an electronic component and including a pivoting sidewall rotatably pivoted to said housing body, said carrier frame being rotatable between a first position, where said carrier frame is disposed in said housing body, and a second position, where said carrier frame is pivoted out of said housing body, said pivoting sidewall including a front pivot plate and a rear pivot plate disposed in longitudinally spaced relationship, each of said front and rear pivot plates extending transversely outward from said pivoting sidewall and said front and rear pivot plates having a respective front pivot and a rear pivot to thereby pivot said carrier frame out of said housing body in said second position and
  a latching assembly disposed on said pivoting sidewall and releasably engaged to said engaging groove so as to position said carrier frame at said second position;
 wherein said latching assembly includes a latching member movably connected to
 said pivoting sidewall, said latching member being movable between an engagement position, where said latching member is engaged with said engaging groove, and a release position, where said latching member is disengaged from said engaging groove.

* * * * *